United States Patent
Lumley et al.

(10) Patent No.: US 6,588,013 B1
(45) Date of Patent: Jul. 1, 2003

(54) PROMOTIONAL MATERIAL DISTRIBUTION SYSTEM WITH AUTOMATIC UPDATING OF PROMOTIONAL MATERIAL SELECTION ALGORITHMS

(75) Inventors: Daniel I. Lumley, Owasso, OK (US); Robert H. McCoy, Broken Arrow, OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/227,401

(22) Filed: Jan. 8, 1999

Related U.S. Application Data
(60) Provisional application No. 60/096,965, filed on Aug. 18, 1998.

(51) Int. Cl.⁷ .......................... H04N 7/10; H04N 7/025; H04N 5/445; G06F 3/00; G06F 13/00
(52) U.S. Cl. .............................. 725/32; 725/36; 725/42
(58) Field of Search .................. 705/14, 10; 725/36, 725/42, 60, 61, 32

(56) References Cited

U.S. PATENT DOCUMENTS

| | | | |
|---|---|---|---|
| 4,602,279 A | 7/1986 | Freeman | 358/86 |
| 4,745,549 A | 5/1988 | Hashimoto | 364/402 |
| 5,155,591 A | 10/1992 | Wachob | 358/86 |
| 5,283,639 A * | 2/1994 | Esch | 348/6 |
| 5,410,344 A | 4/1995 | Graves et al. | 348/1 |
| 5,559,548 A * | 9/1996 | Davis | 348/6 |
| 5,589,892 A | 12/1996 | Knee et al. | 348/731 |
| 5,600,364 A * | 2/1997 | Hendricks | 348/1 |
| 5,619,274 A | 4/1997 | Roop et al. | 348/461 |
| 5,635,978 A | 6/1997 | Alten et al. | 348/7 |
| 5,659,350 A * | 8/1997 | Hendricks | 348/6 |
| 5,758,257 A | 5/1998 | Herz et al. | 455/2 |
| 5,758,258 A | 5/1998 | Shoff et al. | 455/5.1 |
| 5,774,170 A | 6/1998 | Hite et al. | 348/9 |
| 6,075,551 A * | 6/2000 | Berezowski | 348/9 |
| 6,209,130 B1 * | 3/2001 | Rector, Jr. | 725/50 |
| 6,463,585 B1 * | 10/2002 | Hendricks et al. | 725/35 |

FOREIGN PATENT DOCUMENTS

| | | | |
|---|---|---|---|
| WO | WO 91/00670 | 1/1991 | H04N/7/087 |
| WO | WO 95/32585 | 11/1995 | H04N/7/10 |
| WO | WO 9831148 A1 * | 7/1998 | H04N/7/173 |
| WO | WO 98/47279 | 10/1998 | |

\* cited by examiner

Primary Examiner—John Miller
Assistant Examiner—Scott Beliveau
(74) Attorney, Agent, or Firm—Fish & Neave

(57) ABSTRACT

A promotional video system is provided. The promotional video system may include an interactive electronic television program guide. Promotional material is provided to television distribution facilities by a main facility. Promotional material is selected for distribution according to a promotional material selection algorithm. Entries are made in a promotional event log that indicate which promotional material was distributed. The promotional event log is analyzed to determine if promotional material is being optimally selected. Changes to the promotional material selection algorithm may be made to increase the likelihood of desirable selection and to decrease the likelihood of undesirable selection. Testing of the promotional material selection algorithm is also provided.

52 Claims, 11 Drawing Sheets

80

| VIDEO AREA 82 | TERMINATOR ON PAY-PER-VIEW TONIGHT 8:00 - 10:00 CHANNEL 35 ORDER IT NOW 84 |
|---|---|

| CHANNEL | 8:00 PM ⌐90 | 8:30 PM ⌐90 | 9:00 PM ⌐90 | 9:30 PM ⌐90 |
|---|---|---|---|---|
| 2 PUBLIC TELEVISION | DESERTS OF AFRICA ~92 | | WILDLIFE | |
| 3 HBO | BLUE THUNDER | TITANIC | | |
| 4 NBC | SEINFELD | FRIENDS | CAROLINE IN THE CITY | |
| 5 FOX | ~92 YANKEE BASEBALL | | | |

PROGRAMMING AS OF 8:00 PM

MOVIES

| | |
|---|---|
| TERMINATOR | CHANNEL 7 (ABC) |
| THE BIG RED ONE | CHANNEL 2 (CBS) |
| WHEN HARRY MET SALLY | CHANNEL 4 (NBC) |

SPORTING EVENTS

| | |
|---|---|
| NEW YORK GIANTS | CHANNEL 8 (WXBR) |
| YANKEE BASEBALL | CHANNEL 11 (WLIW) |

NEWS

| | |
|---|---|
| LOCAL NEWS | CHANNEL 17 (WLIR) |
| NEWS EXTRA | CHANNEL 5 (FOX) |

97

ANNUAL FAIR, FRIDAY 9:00 A.M. UNTIL 11:00 P.M.

ADMISSION $4.00, TOWN HALL

PROMOTIONAL MATERIAL DISTRIBUTION SYSTEM WITH AUTOMATIC UPDATING OF PROMOTIONAL MATERIAL SELECTION ALGORITHMS

This application claims the benefit of United State provisional patent application No. 60/096,965, filed Aug. 18, 1998.

BACKGROUND OF THE INVENTION

This invention relates to promotional video systems, and more particularly, to electronic television program guide systems in which promotional material selection algorithms may be automatically updated.

Promotional video systems allow television cable operators and other television service providers to supply promotional material (e.g., video, audio, graphics, and text promoting a service or television programming) to users in their homes over a dedicated television channel. An illustrative promotional material distribution system is described in McCoy et al. U.S. patent application Ser. No. 08/779,713, filed Jan. 1, 1997, which is hereby incorporated by reference herein in its entirety.

In a promotional environment such as the one described in the McCoy et al. patent application, promotional material is provided by a main facility to a number of cable system headends. The promotional material may be transmitted to the headends as a stream of digital files (e.g., Moving Pictures Experts Group (MPEG) MPEG-1.5X files) or real-time videos over a satellite link, or may be provided on laserdisks that are provided to the headends via a suitable mail carrier.

One type of promotional material distribution system is the so-called passive electronic program guide in which promotional videos and a list of television program listings are distributed to viewers on a dedicated television channel. In one such known passive electronic program guide system, a satellite uplink facility supplies a continuous real-time stream of global promotional videos, a real-time data stream describing the global promotional videos, and a data stream of program listings information to a number of cable system headends. The video stream includes right and left video channels and corresponding audio tracks.

The headends in this passive program guide system have the ability to choose promotional videos from the right and left video channels based on the real-time data stream describing the videos. The videos are selected for distribution according to playlist scripts or promotional philosophies. Playlist scripts are promotional material selection algorithms designed to schedule the distribution of particular types of promotional events. Promotional philosophies are more advanced promotional material selection algorithms that attempt to maximize the return on a promotional event. Promotional philosophies are designed to play promotional events at the time a target audience group is most likely to view them.

The headends generate display screens containing the promotional video from the selected video channel, text or graphics describing the selected video from the real-time data stream, and suitable program listings information. The display screens are distributed over a dedicated television channel to the users served by the headend for display on their televisions.

In a variation on this approach, global promotional videos are also generated by a main facility and stored on laserdisks. The laserdisks are provided to cable system headends via a suitable mail carrier in addition to the real-time stream of videos. Program listings information (e.g., channel line ups, titles, etc.) and/or other program guide data are provided over a serial communications or a satellite link between the main facility and the headends. The global promotional videos are displayed until a "local segment" occurs. During the "local segment" the headends select promotional videos from the laserdisks according to a promotional philosophy or playlist script.

In another known promotional material distribution system, promotional videos are generated and stored as MPEG-1.5X files. The MPEG-1.5X files are transmitted to headends in the edge band of a satellite link. The headends select promotional videos according to a promotional philosophy. The selected videos are included in display screens that are sent to a number of users over a dedicated television channel.

In each of these approaches, the headends are typically supplied with a predefined promotional philosophy script by the satellite uplink facility. Promotional material information associated with the promotional material may also be supplied to the headends. The headends select promotional material for distribution when the promotional material information associated with the promotional material meets parameters contained in the promotional philosophy.

It is difficult to predict which promotions and advertisements will actually be selected and distributed by the headends because promotional material is selected dynamically at the headend according to the promotional philosophy or playlist script. Knowing which videos were sent to the users is important for designing effective promotional philosophies and playlist scripts that maximize returns on promotions. Promotional material distribution systems typically record which videos were distributed in an "as-run" log.

Analyzing a promotional event log would allow corrections to be made to parameters in the promotional philosophy script to achieve a desired promotional philosophy. This is typically done manually, by an operator or number of operators at the main facility. The operators import the promotional event log into a computer spreadsheet or word processing application to manually determine if promotional material is distributed as desired. This manual approach is somewhat labor intensive and is susceptible to operator errors.

It is therefore an object of the present invention to provide a promotional material distribution system in which promotional material selection algorithms are automatically updated based on a promotional event log without involving extensive manual analysis by operators.

SUMMARY OF THE INVENTION

This and other objects of the present invention are accomplished in accordance with the principles of the present invention by providing a promotional video system in which promotional events are logged in a promotional event log that is used subsequently to automatically update a promotional material selection algorithm.

Promotional material (e.g., video, audio, graphics, and text material promoting television services or programming or advertising a product or service) may be provided by a data source in a main facility. This information may be transmitted to a television distribution facility such as a cable system headend or direct-to-the-home satellite broadcasting facility via a satellite link or other high-bandwidth terrestrial wired or wireless communications link. The promotional material may also be provided to the television distribution facility via any suitable portable storage media (e.g., laser disk, digital versatile disk (DVD), tape, diskette, etc.). The television distribution facility may also have a data source for providing promotional material generated by the television distribution facility, or for providing promotional material generated by the main facility or other suitable facility and supplied to the television distribution facility on portable media or by any other suitable data distribution technique.

The television distribution facility may distribute the promotional material to the user television equipment (e.g., any suitable television, television and set-top box combination, or personal computer television (PC/TV), etc.) of a number of users on a dedicated channel (e.g., the Prevue Channel®) for viewing. In an alternative embodiment of the invention, the television distribution facility may distribute the promotional material to the user television equipment of a number of users for display in program guide display screens by an interactive television program guide.

Regardless of how promotional events are provided by the television distribution facility, a promotional event log is maintained by the television distribution facility. The promotional event log may include entries for the time of day a promotional event was distributed or displayed, attributes of how the promotional event was performed, which script version was active at the time, the first choice of promotional event, the title of the promotional event, the actual file (e.g., text, graphic, audio or video) that was utilized in the promotional event, actual duration of the promotional event in milliseconds and frames, expected duration, display attributes, actual computed overlay (e.g., channel 16 at 4:00 P.M.), and any special play effects. The promotional event log may be maintained by a promotional event recorder in the television distribution facility. The promotional event log may be made available to the main facility via any suitable medium. For example, the promotional event log may be transmitted to the main facility via telephone dial-up, bidirectional satellite communications, or by portable storage media (e.g., floppy discs or tapes).

A promotional event log analyzer at the main facility is programmed to automatically determine if promotional material is being selected optimally based on the promotional event log. Optimal promotional material selection may occur, for example, when the likelihood of desirable promotional material selection is maximized and when the likelihood of undesirable promotional material selection is minimized. The promotional event log analyzer may, for example, be programmed with a desirable occurrences database and an undesirable occurrences database. The desirable occurrences database may include a number of rules that define desirable promotional event occurrences. The desirable occurrences database may, for example, define as desirable having a large number of promotions of a particular theme during a particular time slot, having certain promotional events in certain time slots for different time zones, having particular promotional events sent to television distribution facilities of a certain service configuration (e.g., providers of multiple pay-per-view channels as opposed to those with none), or any other suitable desirable occurrence.

The undesirable occurrences database may include a number of rules that define undesirable promotional event occurrences. The undesirable database may define as undesirable, for example, having the same promotional event distributed more than one time in a row or more than a number of times an hour, having promotional events of a particular theme during a particular time slot (e.g., adult pay-per-view promotions at 5:00 p.m.), or any other undesirable occurrence.

The promotional event log analyzer may determine if promotional material is being selected optimally by comparing the promotional event log with the desirable occurrences database and the undesirable occurrences database. Desirable and undesirable promotional event occurrences are tracked, and changes are made to the promotional material selection algorithm to reduce the likelihood of having undesirable occurrences and to increase the likelihood of having desirable occurrences. The new promotional material selection algorithm is provided to the television distribution facilities for use during promotional event selection.

Providing the promotional event log to the main facility for analysis and updating may provide for the centralized monitoring and control by a single main facility of a promotional material selection algorithm that is used by a number of television distribution facilities. Thus, a single main facility may centrally design a promotional material selection algorithm that substantially predetermines the types of advertisements presented to a large user base. Updating the promotional material selection algorithm based on a promotional event log indicating the promotional events that are actually distributed by a television distribution facility to a number of users may allow the main facility to more accurately predetermine the types of advertisements presented. In addition, providing the promotional event log to the main facility for analysis and updating may also provide for the centralized testing and design of a promotional material selection algorithm before it is used in the field.

Further features of the invention, its nature and various advantages will be more apparent from the accompanying drawings and the following detailed description of the preferred embodiments.

BRIEF DESCRIPTION OF THE DRAWINGS

FIG. 2 is an illustrative promotional material display screen in accordance with the principles of the present invention.

FIG. 8 is an illustrative program listings display screen in accordance with the principles of the present invention.

DETAILED DESCRIPTION OF THE PREFERRED EMBODIMENTS

Figure 1:
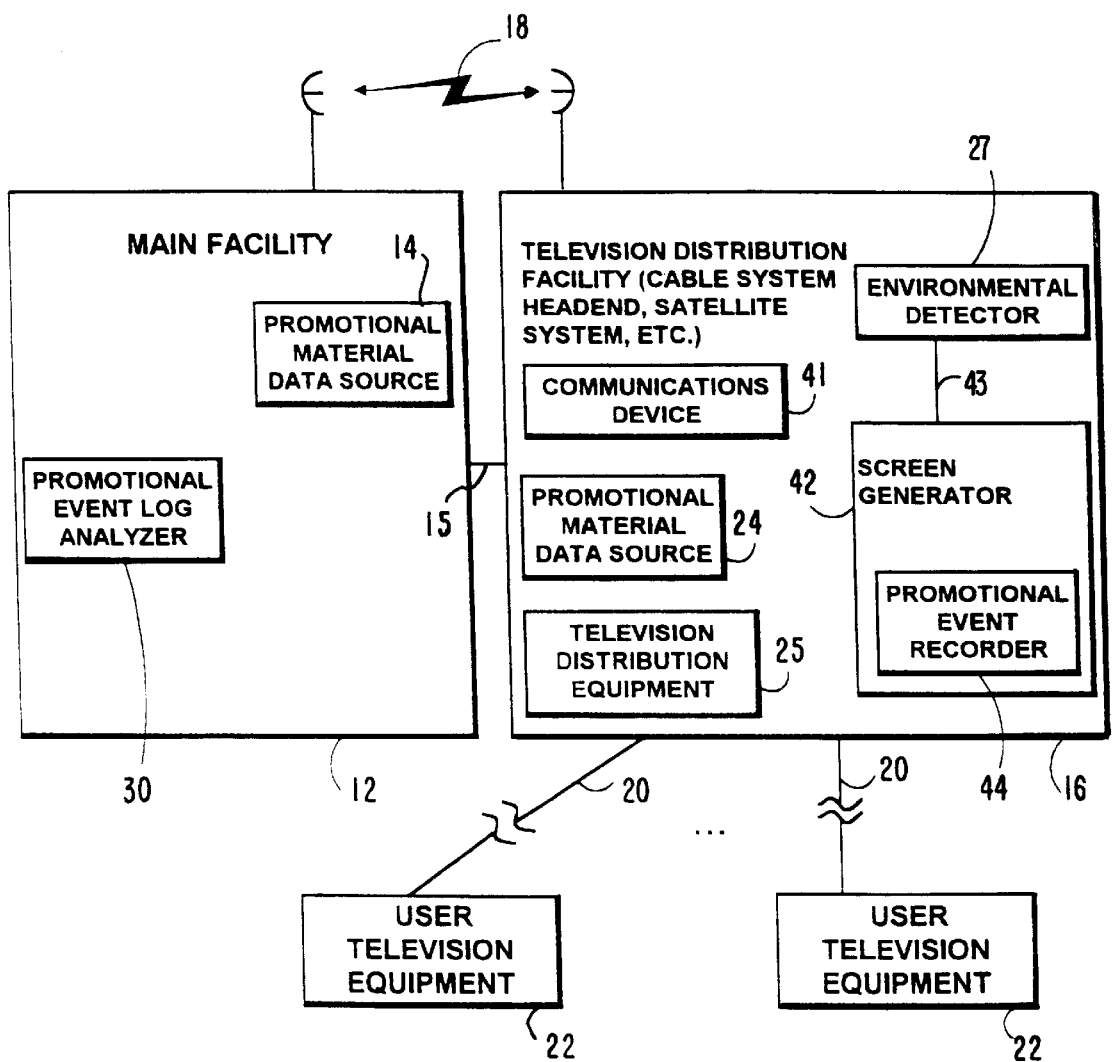
FIG. 1 is a schematic block diagram of a system in accordance with the principles of the present invention.

An illustrative system 10 in accordance with the present invention is shown in FIG. 1. Main facility 12 provides promotional material and television program listings from promotional material data source 14 to television distribution facility 16 via communications link 18. There are preferably numerous television distribution facilities 16, although only one such facility is shown in FIG. 1 to avoid over-complicating the drawing. Link 18 is preferably a satellite link, but may be a telephone network link, a cable or fiber optic link, a microwave link, a combination of such links, or any other suitable satellite based or terrestrial wired or wireless communications link. If it is desired to transmit video signals over link 18 in addition to data signals, a relatively high bandwidth link such as a satellite link may generally be preferred to a relatively low bandwidth link such as a telephone line. Television distribution facility 16 may be any suitable television distribution facility (e.g., a cable system headend, a broadcast distribution facility, a satellite television distribution facility, or any other suitable distribution facility).

The promotional material provided by main facility 12 may be provided to television distribution facility 16 as a continuous data stream. Promotional material may also be provided to television distribution facility 16 on any suitable portable medium (e.g., laser disk, tape, diskette, etc.), and played back by promotional material data source 24 in television distribution facility 16 for distribution to users. Promotional material data source 24 may also be used by television distribution facility 16 for providing locally generated promotional material. The promotional material distributed within system 10 may include any suitable type of promotional material. It may include promotions of local, regional, or national events. It may also include pay-per-view promotions and subscription information, premium channel (e.g., HBO or CNN) promotions, or any suitable advertisement. The promotional material may include any desired combination of text, graphics, audio, and video.

Television distribution facility 16 may have screen generator 42 for generating promotional material display screens that include at least some of the promotional material supplied by main facility 12. The display screens may be designed to promote events while providing television programming and other information. Screen generator 42 selects promotional material for distribution to user television equipment 22 from the promotional material supplied by main facility 12 and from the promotional material generated locally by television distribution facility 16. Screen generator 42 may include the selected promotional material in a promotional material display screen for distribution to user television equipment 22 by television distribution equipment 25.

Television distribution equipment 25 may include, for example, a cable headend modulator, or may include any other necessary or additional equipment suitable for transmitting the display screens to the users over communications paths 20. Communications paths 20 preferably have sufficient bandwidth to allow television distribution facility 16 to distribute television programming to the users. If desired, television programming may be provided over separate communications paths (not shown) and television distribution equipment 25 may, for example, have separate hardware dedicated to sending the display screens and the television programming.

The display screens may be distributed, for example, on a dedicated television channel. If desired, the display screens may be distributed as digital frames (e.g., as Moving Pictures Experts Group (MPEG) MPEG-2 files), or the promotional material may be distributed from television distribution facility 16 as data and displayed as a promotional material display screen by a set-top box or other suitable component. This aspect of the invention is described in more detail below. Each user has user television equipment, 22 (e.g., any suitable television, television and cable set-top box combination, or personal computer television (PC/TV), etc.) for viewing the promotional material display screens and television programming.

An illustrative promotional material display screen 80 is shown in FIG. 2. Promotional material display screen 80 may be divided into video promotion area 82, text promotion area 84, and program listings area 86 or any combination thereof. Video promotion area 82 may contain video promotional material. It may, for example, provide a video clip of a pay-per-view selection being promoted, such as a video clip of the movie Terminator. Text promotion area 84 may contain text describing the promotional video. In the case where video promotion area 84 displays a video clip of Terminator, text promotion area 84 may display textual information about when Terminator airs and on what channel it airs.

Program listings area 86 may display television program listings in any suitable format, such as any suitable list, table, or grid. FIG. 2 illustrates the display of program listings in program listings grid 88. Program listings grid 88 may be divided into a number of columns 90 which correspond to program broadcast times and which may be equally spaced apart (e.g., in thirty-minute steps), and a number of rows 92 where each row 92 corresponds to a different channel. Program listings grid 88 may scroll continuously or page periodically to display program listings for additional channels.

Screen generator 42 may select promotional material for distribution according to a promotional material selection algorithm such as a promotional philosophy, playlist script, or other suitable promotional material selection algorithm. A promotional philosophy, for example, is a promotional material selection algorithm used by television distribution facility 16 to attempt to maximize returns from promotional material by positioning certain types of promotional material at particular times of the day thereby reaching certain types of television viewers.

Main facility 12 may provide the promotional material selection algorithm to television distribution facility 16 in any suitable format. The promotional material selection algorithm may be provided for example, as scripts, or templates that are used by screen generator 42 to select promotional material. Another suitable approach may involve providing the promotional material selection algorithm as executable computer code files that are run by screen generator 42. The promotional material selection algorithm may be provided by promotional material data source 14 to television distribution facility 16 as part of the data stream that contains the promotional material. Alternatively, the promotional material selection algorithm may be provided to television distribution facility 16 on portable storage media via a suitable mail carrier.

The promotional material that is actually distributed by television distribution facility 16 to user television equipment 22 may depend on parameters in the promotional material selection algorithm. These parameters may be based on attributes associated with the promotional material or with environmentally detectable situations. Parameters may include, for example, promotional theme, type of event being promoted, time the event being promoted occurs, local weather, local channels, or any other suitable parameter.

Data used by screen generator 42 when determining if a particular parameter is met by a particular promotional event may be supplied by main facility 12 as part of the promotional material data stream, or may be provided locally by television distribution facility 16. For example, whether a particular promotional event is selected for distribution may depend on the local temperature. The local temperature may be supplied by main facility 12 as part of local weather data contained in the data stream, or may be supplied by a local operator or device responsible for supplying local temperature information at television distribution facility 16, such as environmental detector 27. Environmental detector 27 may, for example, have a digital thermometer connected to the input-output port of a suitable computer and provide detectable environmental situation information (e.g., temperature data) to screen generator 42 via input 43. Environmental detector 27 may be any other device suitable for detecting environmental situations, such as a barometer, windspeed measuring device, or other suitable device, that is capable of supplying detectable environmental situation information to screen generator 42 for use in detecting if an environmentally detectable situation parameter has been met.

The promotional material that is actually distributed by television distribution facility 16 to user television equipment 22 may also depend on the availability of the promotional material. For example, promotional material may be supplied locally by television distribution facility 16 using any type of suitable magnetic or optical storage device. If the particular magnetic or optical medium containing the desired promotional material is not available (e.g., is not loaded), otherwise desirable promotional material for a promotional event will not be available for distribution. In this situation, screen generator 42 must select some other promotional event for distribution that meets the promotional material selection algorithm. For example, part of the promotional material selection algorithm may involve initially promoting local television programs scheduled for broadcasting within the next three hours and subsequently promoting premium channels. If the promotional material relating to local television programs is not available, screen generator 42 may continuously select premium channel promotions.

The promotional material that is actually distributed by television distribution facility 16 to user television equipment 22 is therefore not easily predicted. It is also difficult to test changes to the promotional material selection algorithm. To facilitate the process of making changes to the promotional material selection algorithm television distribution facility 16 has promotional event recorder 44 for maintaining a promotional event log which is provided to main facility 12 over communications link 15 (FIG. 1). Promotional event recorder 44 may be any suitable combination of hardware and software. For example, promotional event recorder may be computer system which has a storage device (e.g., a disk drive) and suitable software and which is compatible with the equipment used in television distribution facility 16. Promotional event recorder 44 may also be either a component of screen generator 42 with suitable software running on screen generator 42, a separate device connected to screen generator 42 via a suitable connection structure (e.g., a serial connection, Ethernet network, infrared transmitter/receiver, etc.), or any combination thereof.

The promotional event log maintained by promotional event recorder 44 may be maintained in any suitable file format or database (e.g., text, a Microsoft Access database, a Structured Query Language (SQL) database, or any other suitable file format or database). Preferably, a standardized file format or database (e.g., a tab delimited text file, SQL database, etc.) is used that can be imported by a number of types of software applications (e.g., Microsoft Excel, Microsoft Access, D-Base, etc.).

The promotional event log preferably contains information useful to main facility 12 when analyzing the distribution patterns of television distribution facility 16. The promotional event log may include, for example, the time of day the promotional event was distributed, attributes of how the promotional event was performed, which promotional material selection algorithm version was active at the time, the first choice of promotional event, the title of the promotional event, the actual file (e.g., text, graphic, audio or video) that was utilized in the promotional event, actual duration of the promotional event in milliseconds and frames, expected duration, display attributes, actual computed overlay (e.g., channel 16 at 4:00 P.M.), and any special play effects.

The promotional event log may be provided to main facility 12 via communications link 15 (FIG. 1). Communications link 15 may be any suitable communications link. Communications link 15 may include, for example, a dial-up telephone link, a network or Internet link (e.g., 10Base2, 10Base5, 10BaseT, 100BaseT, 10BaseF, T1, T3, etc.), a radio frequency link, a satellite link, a cable television link, or any other suitable communications link. Communications link 15 may also include portable storage media (e.g., floppy disks or tapes). The promotional event log may be transmitted from television distribution facility 16 to main facility 12 automatically or on demand. Promotional event log analyzer 30 may also monitor changes to the promotional event log over communications link 15 to observe the selecting of promotional events at about the same time they are selected. Promotional event recorder 44, as part of its configuration, may also provide for the automatic partial or total deletion of the promotional event log.

Figure 3:
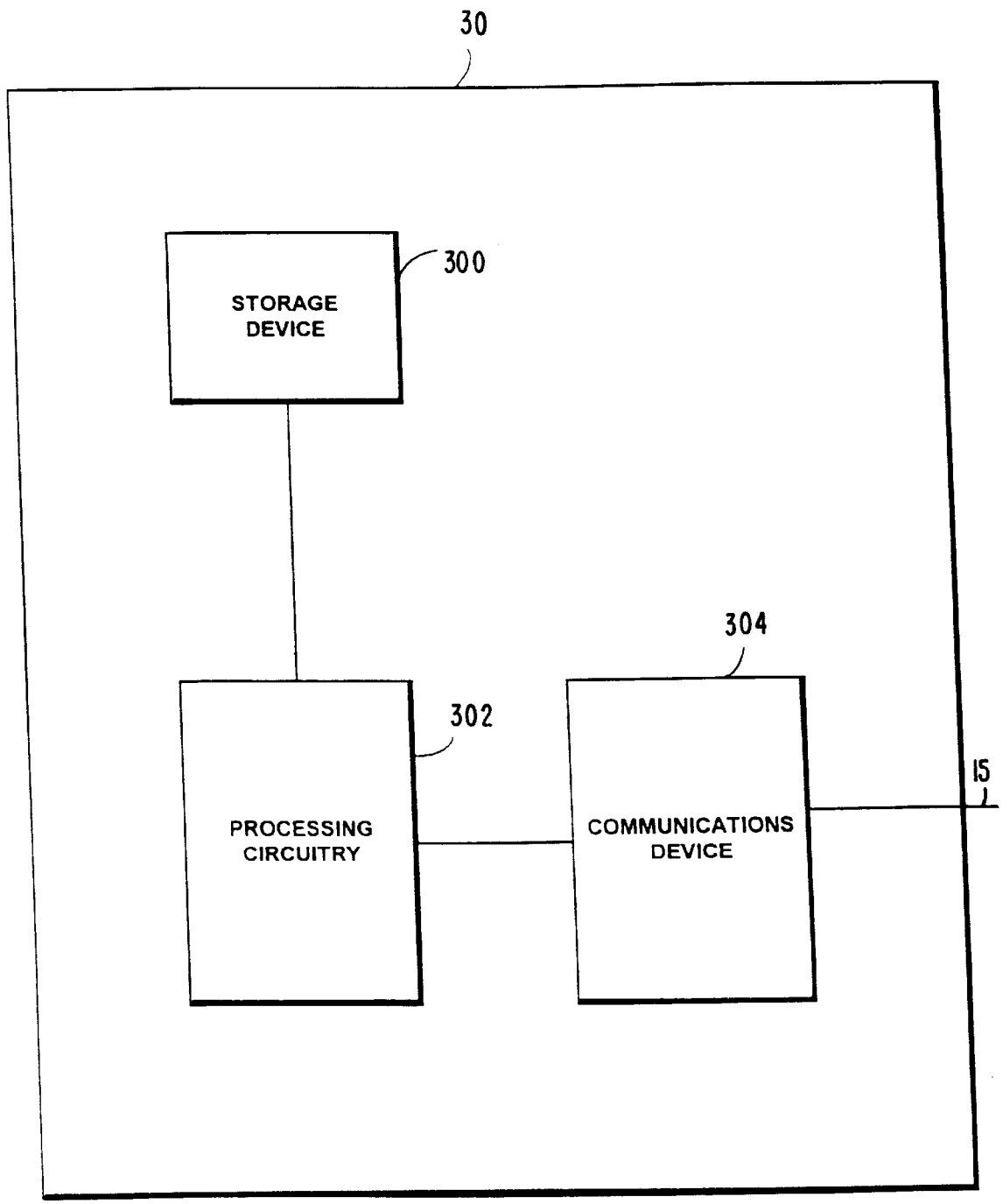
FIG. 3 is an illustrative block diagram of the promotional event log analyzer of FIG. 1 in accordance with the principles of the present invention.

The promotional event log may be used by promotional event log analyzer 30 to modify the promotional material selection algorithm used by screen generator 42 in order to achieve the desired results for the promotional material selection algorithm, or to test how changes to a promotional material selection algorithm might affect promotional material selection. A more detailed block diagram of promotional event log analyzer 30 is shown in FIG. 3. Promotional event log analyzer 30 may be any suitable hardware, software, or combination thereof. As illustrated in FIG. 3, promotional event log analyzer 30 may include storage device 300, processing circuitry 302, and communications device 304. Storage device 300 may be any suitable storage device or memory, such as a hard disk drive, RAM, ROM, or any other suitable storage device or memory. Processing circuitry 302 may be any suitable processor, such as the Intel Pentium II®, and may be connected to any suitable circuitry (e.g., memory, input/output control circuitry, etc.) necessary for analyzing the promotional event log.

Communications device 304 may be connected to communications device 41 (FIG. 1) at television distribution facility 16 via communications link 15. Communications devices 304 and 41 may be any device suitable for providing communications over communications link 15, such as a modem (e.g., any suitable analog or digital standard, cable, cellular or other modem), a network interface card (e.g., an Ethernet card, token ring card, etc.), a wireless transceiver (e.g., a radio or other suitable analog or digital transceiver), or other suitable communications device.

Figure 4:
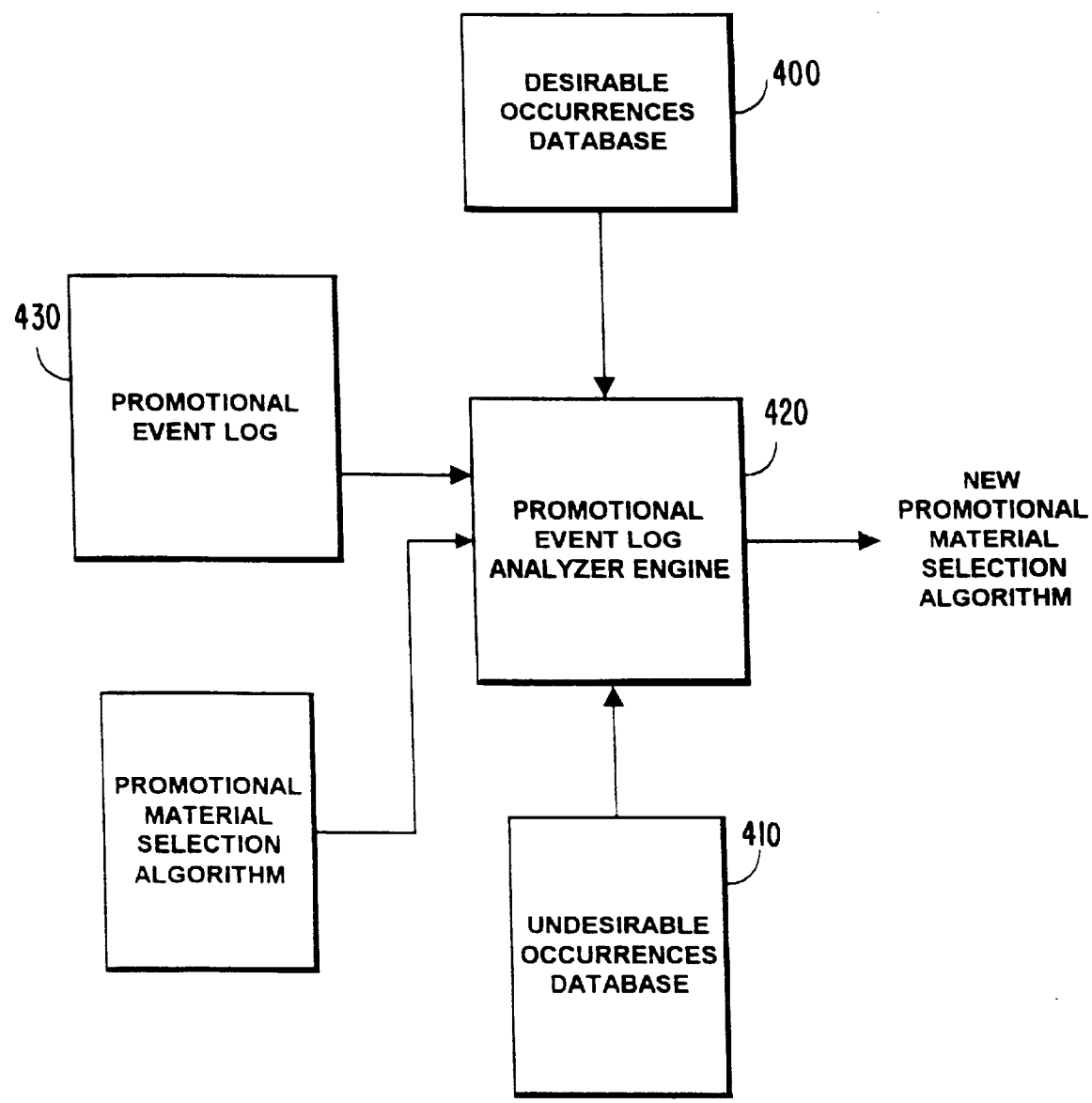
FIG. 4 is an illustrative data flow diagram for analyzing a promotional event log in accordance with the principles of the present invention.

Promotional event log analyzer 30 may make changes to a promotional material selection algorithm if the algorithm does not provide for optimal promotional material selection. FIG. 4 is an illustrative dataflow diagram for analyzing a promotional event log to determine if promotional material is being selected optimally. Promotional event log analyzer 30 may, for example, be programmed with desirable occurrences database 400 and undesirable occurrences database 410. Desirable occurrences database 400 may include a number of rules that define desirable promotional event occurrences. Desirable occurrences database 400 may, for example, define as desirable having a large number of promotions of a particular theme during a particular time slot, having certain promotional events in certain time slots for different time zones, having particular promotional events sent to television distribution facilities of a certain service configuration (e.g., providers of multiple pay-per-view channels as opposed to those with none), or any other suitable desirable occurrence.

Undesirable occurrences database 410 may include a number of rules that define undesirable promotional event occurrences. Undesirable occurrences database 410 may define as undesirable, for example, having the same promotional event distributed more than one time in a row or more than a number of times an hour, having promotional events of a particular theme during a particular time slot (e.g., adult pay-per-view promotions at 5:00 p.m.), or any other undesirable occurrence.

Promotional event log analyzer engine 420 may compare the promotional event log 430 with desirable occurrences database 400 and undesirable occurrences database 410. Promotional event log analyzer engine 420 may be any suitable process or application capable of, for example, comparing promotional event log 430, desirable occurrences database 400, and undesirable occurrences database 410. Promotional event log analyzer engine 420 may make changes to the promotional material selection algorithm to increase the likelihood of having desirable occurrences and to reduce the likelihood of having undesirable occurrences. The new promotional material selection algorithm may be generated by promotional event log analyzer engine 420 and provided by promotional material data source 14 to the television distribution facility 16 for use during promotional material selection.

The promotional event log may also be used by main facility 12 to test planned changes for a promotional material selection algorithm. Main facility 12 may have, for example, a screen generator and a promotional event recorder to which promotional material is supplied and selected according to a test promotional material selection algorithm. The test promotional material selection algorithm may, for example, be a modified version of the current algorithm used at the television distribution facilities, or it may be a totally new algorithm. The test promotional event log may be analyzed by promotional event log analyzer 30, and changes made to the test promotional material selection algorithm if promotional material is not being selected optimally. This process may continue until the test promotional material selection algorithm selects promotional material as close to optimally as may be determined without running the promotional material selection algorithm in the field.

The promotional material selection algorithm already running at the television distribution facilities may be replaced by the test promotional material selection algorithm, or modified accordingly. Promotional material selection algorithm testing may also be accomplished by running a test promotional material selection algorithm at television distribution facility 16 in addition to the promotional material selection algorithm already running (e.g., as a separate process) on screen generator 42.

Figure 5:
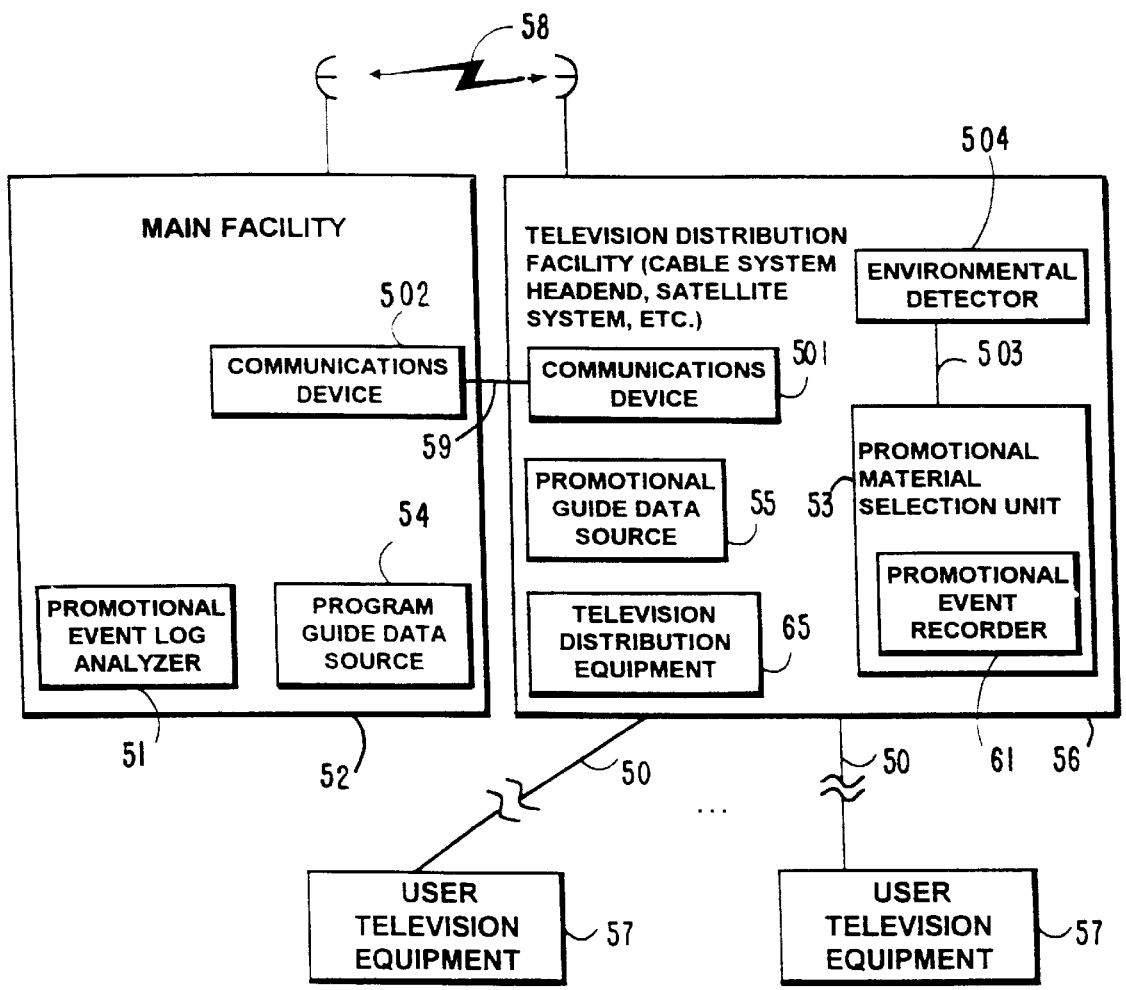
FIG. 5 is a schematic block diagram of a system in accordance with a further embodiment of the present invention.

The features of the present invention may be provided in a promotional material distribution system in which an interactive television program guide is implemented such as system 11 of FIG. 5. Main facility 52 provides program guide data from program guide data source 54 to television distribution facility 56 via communications link 58. There are preferably numerous television distribution facilities 56, although only one such facility is shown in FIG. 5 to avoid over-complicating the drawing. Link 58 may be a satellite link, a telephone network link, a cable or fiber optic link, a microwave link, a combination of such links, or any other suitable communications path. If it is desired to transmit video signals over link 58 in addition to data signals, a relatively high bandwidth link such as a satellite link may generally be preferred to a relatively low bandwidth link such as a telephone line. Television distribution facility 56 may be any suitable distribution facility (e.g., a cable system headend, a broadcast distribution facility, or a satellite television distribution facility).

The program guide data provided by program guide data source 54 and transmitted by main facility 52 to television distribution facility 56 may include television program listings data (e.g., program times, channels, titles, and descriptions) and data for services other than television program listings (e.g., weather information, associated Internet web links, computer software, etc.). The data provided by main facility 52 may be provided to television distribution facility 56 as a continuous data stream. The data stream may contain "holes" into which data that is supplied by television distribution facility 56 may be inserted. The "holes" may occur, for example, on the hour, every half-hour, etc. Promotional material may also be supplied by main facility 52 to television distribution facility 56 as part of the data stream or on any suitable portable storage media (e.g., laser disk, tape, etc.).

Main facility 52 may also provide the promotional material selection algorithm as part of the data stream to television distribution facility 56 in any suitable format. The promotional material selection algorithm may be provided for example, as scripts, or templates that are used by promotional material selection unit 53 to select promotional material. Another suitable approach may involve providing the promotional material selection algorithm as executable computer code files that are run by promotional material selection unit 53. Alternatively, the promotional material selection algorithm may be provided by main facility 52 on portable storage media that are mailed to television distribution facility 56 via a suitable mail carrier.

Television distribution facility 56 may also have promotional guide data source for providing locally generated promotional material or promotional material generated by main facility 52 and supplied to television distribution facility 56 on portable storage media. Television distribution facility 56 may also have promotional material selection unit 53 for selecting promotional material according to a promotional material selection algorithm supplied by main facility 52.

Promotional event recorder 61 may be used to record information in a promotional event log regarding which promotional events are distributed. Promotional event recorder 61 may be any combination of hardware and software suitable for this purpose. For example, promotional event recorder 61 may be computer system which has a storage device (e.g., a disk drive) and suitable software and which is compatible with the equipment used in television distribution facility 56. Promotional event recorder 61 may also be either a component of promotional material selection unit 53 running suitable software, a separate device connected to promotional material selector unit 53 via a suitable connection structure (e.g., a serial connection, Ethernet network, infrared transmitter/receiver, etc.), or any combination thereof. The promotional event log may be supplied by communications device 51 in television distribution facility 56 to communications device 502 in main facility 52 over communications link 59.

Communications link 59 may be any communications link suitable for supporting transmission of the promotional event log from television distribution facility 56 to main facility 52. Communications link 59 may include, for example, a dial-up telephone link, a network or Internet link (e.g., 10Base2, 10Base 5, 10BaseT, 100BaseT, 10BaseF, T1, T3, etc.), a radio frequency link, a satellite link, a cable television link, or any other suitable communications link. Communications devices 501 and 502 may be any device suitable for providing communications over communications link 59, such as a modem (e.g., any suitable analog or digital standard, cable, cellular or other modem), a network interface card (e.g., an Ethernet card, token ring card, etc.), a wireless transceiver (e.g., a radio or other suitable analog or digital transceiver), or other suitable communications device.

For clarity, this embodiment of the present invention will be illustrated in connection with a system arrangement in which data is distributed from a main facility to an interactive television program guide on user television equipment via a television distribution facility. Other suitable systems involve systems in which data is distributed to a program guide on user television equipment using other suitable distribution schemes, such as schemes involving data transmission over the Internet or the like. If desired, the interactive application may be implemented using a client-server architecture in which the primary processing power for the application is provided by a server located at, for example, the television distribution facility or the main facility and user television equipment acts as a client processor. If, for example, set-top box 68 has a cable modem for providing Internet access, set-top box 68 may request data from television distribution facility 56.

Television distribution facility 56 may have television distribution equipment 65 for distributing the program guide data and selected promotional material to multiple users via communications paths 50. Television distribution equipment 65 may be any equipment suitable for distributing the program guide data and selected promotional material on, for example, on a television channel sideband, in the vertical blanking interval of a television channel, using an in-band digital channel, using an out-of-band digital signal, or by any other suitable data transmission technique. Communication paths 50 preferably have sufficient bandwidth to allow television distribution facility 56 to distribute television programming to user television equipment 57. If desired, television programming may be provided over separate communications paths (not shown). Television distribution equipment 65 may, for example, have separate hardware dedicated to sending the program guide data and selected promotional material and the television programming.

Figure 6:
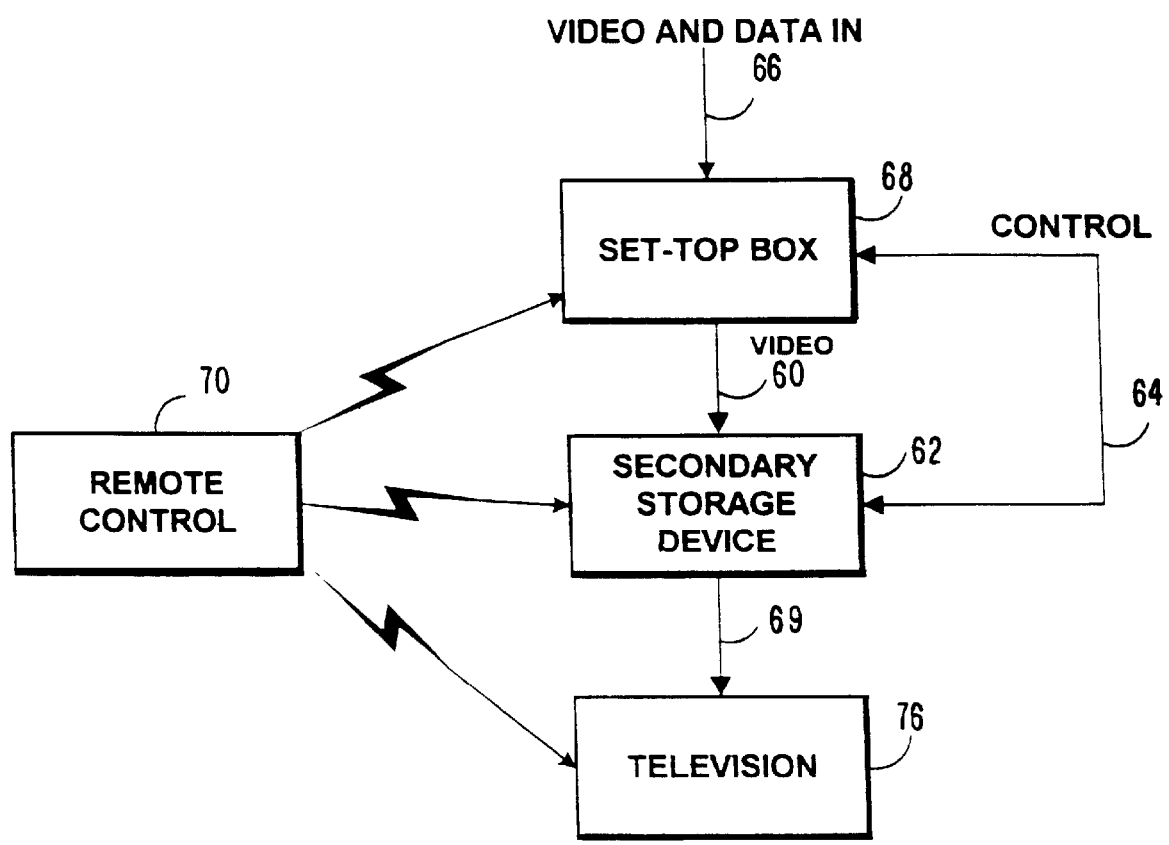
FIG. 6 is an illustrative schematic block diagram of the user television equipment of FIG. 5 in accordance with the principles of the present invention.

Each user has user television equipment 57 for receiving the program guide data and displaying corresponding program listings information. The selected promotional material may also be displayed. An interactive television program guide may be implemented on user television equipment 57 to handle functions associated with displaying the program listings, other television program information, and selected promotional material.. An illustrative arrangement for user television equipment 57 is shown in FIG. 6. User television equipment 57 of FIG. 6 receives video, data, and promotional material from television distribution facility 56 (FIG. 5) at input 66. During normal television viewing, the user tunes set-top box 68 to a desired television channel. The signal for that television channel is then provided at video output 60. The signal is output typically as either a radiofrequency (RF) signal on a predefined channel (e.g., channel 3 or 4) or a demodulated video signal, but may also be a digital signal output on an appropriate digital bus (e.g., a bus using the IEEE 1394 standard).

The video signal at output 60 is received by optional secondary storage device 62. Secondary storage device 62 can be any suitable type of analog or digital program storage device (e.g., a videocassette recorder, a digital video disc (DVD) player with the ability to record DVD discs, etc.). Program recording and other features may be controlled by set-top box 68 using control path 64. If secondary storage device 62 is a videocassette recorder, for example, a typical control path 64 involves the use of an infrared transmitter coupled to the infrared receiver in the videocassette recorder that normally accepts commands from a remote control such as remote control 70. Remote control 70 may be used to control set-top box 68, secondary storage device 62, and television 76.

Television 76 receives RF or demodulated video signals from secondary storage device 62 via communications path 69. The video signals on communications path 69 may either be generated by secondary storage device 62 when playing back a prerecorded storage medium (e.g., a videocassette or a recordable digital-video disc), may be passed through from set-top box 68, or may be provided directly to television 76 from set-top box 68 if secondary storage device 62 is not included in user television equipment 57. During normal television viewing, the video signals provided to television 76 correspond to the channel to which the user has tuned with set-top box 68.

Figure 7:
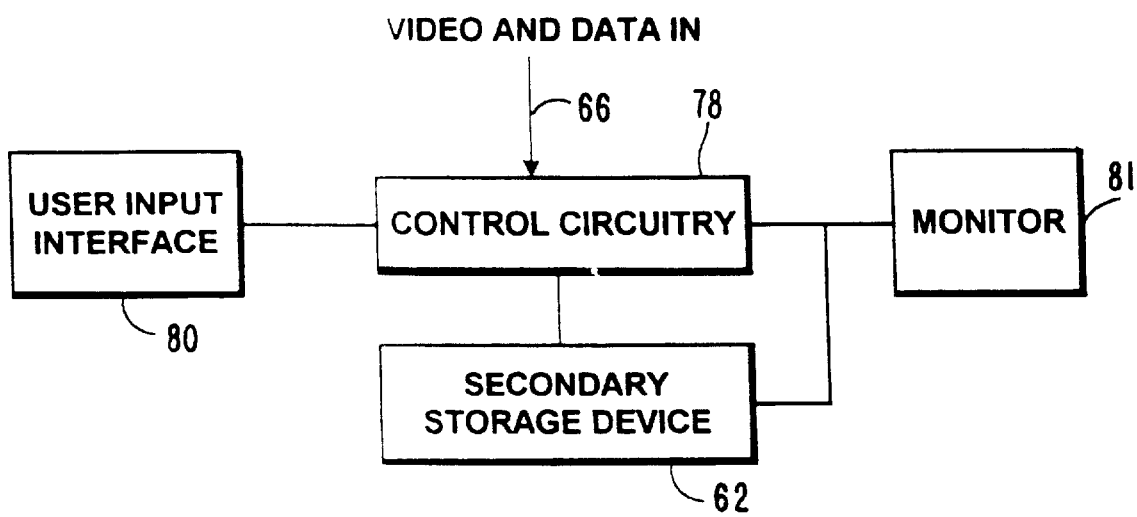
FIG. 7 is a generalized schematic block diagram of portions of the illustrative television equipment of FIG. 6 in accordance with the principles of the present invention.

A more generalized embodiment of user television equipment 57 is shown in FIG. 7. As shown in FIG. 7, control circuitry 78 of user television equipment 57 receives program guide data such as program listings and associated information, and selected promotional material from television distribution facility 56 (FIG. 5). The user controls the operation of user television equipment 57 with user input interface 80. User input interface 80 may be a pointing device, wireless remote control, keyboard, touch-pad, voice recognition system, or any other suitable user input device. To watch television, the user instructs control circuitry 78 to display a desired television channel on monitor 81. To access the features of the program guide, the user instructs the program guide implemented on user television equipment 57 to generate a main menu or other suitable program guide display screen for display on monitor 81.

The functions of control circuitry 78 may be provided using the set-top box arrangement of FIG. 7. Alternatively, these functions may be integrated into an advanced television receiver, personal computer television (PC/TV), or any other suitable arrangement. If desired, a combination of such arrangements may be used.

The interactive program guide may generate for display program guide display screens corresponding to various features provided by the interactive program guide. Promotional material may be displayed as part of any program guide display screen displayed on user television equipment 57 by the interactive program guide. One program guide display screen that may be provided is a program listings display screen, such as illustrative program listings display screen 96 shown in FIG. 8.

Program listings may be displayed in a program listings display screen using any suitable list, table, or grid, such as program listings grid 88 of FIG. 2. The program listings may, for example, be displayed in a list organized according to multiple organization criteria and sorted in various ways. For example, the listings contained in program listings display screen 96 of FIG. 8 are displayed in a list organized according programming type and sorted alphabetically. Program listings display screen 96 may contain promotional material display area 97 for displaying promotional material.

The promotional material displayed in promotional material display area 97 or in any area of any display screen is selected by promotional material selection unit 53 according to the promotional material selection algorithm. Promotional event log recorder 61 may record information regarding which promotional events were distributed, and the promotional event log may be provided to promotional event log analyzer, 51 of main facility 52 over communications link 59. Promotional event log analyzer 51 analyzes the promotional event log to determine if promotional material is by selected optimally. Promotional event log analyzer 51 may make changes to the promotional material selection algorithm to increase the likelihood of having desirable occurrences, and to decrease the likelihood of having undesirable occurrences.

Figure 9:
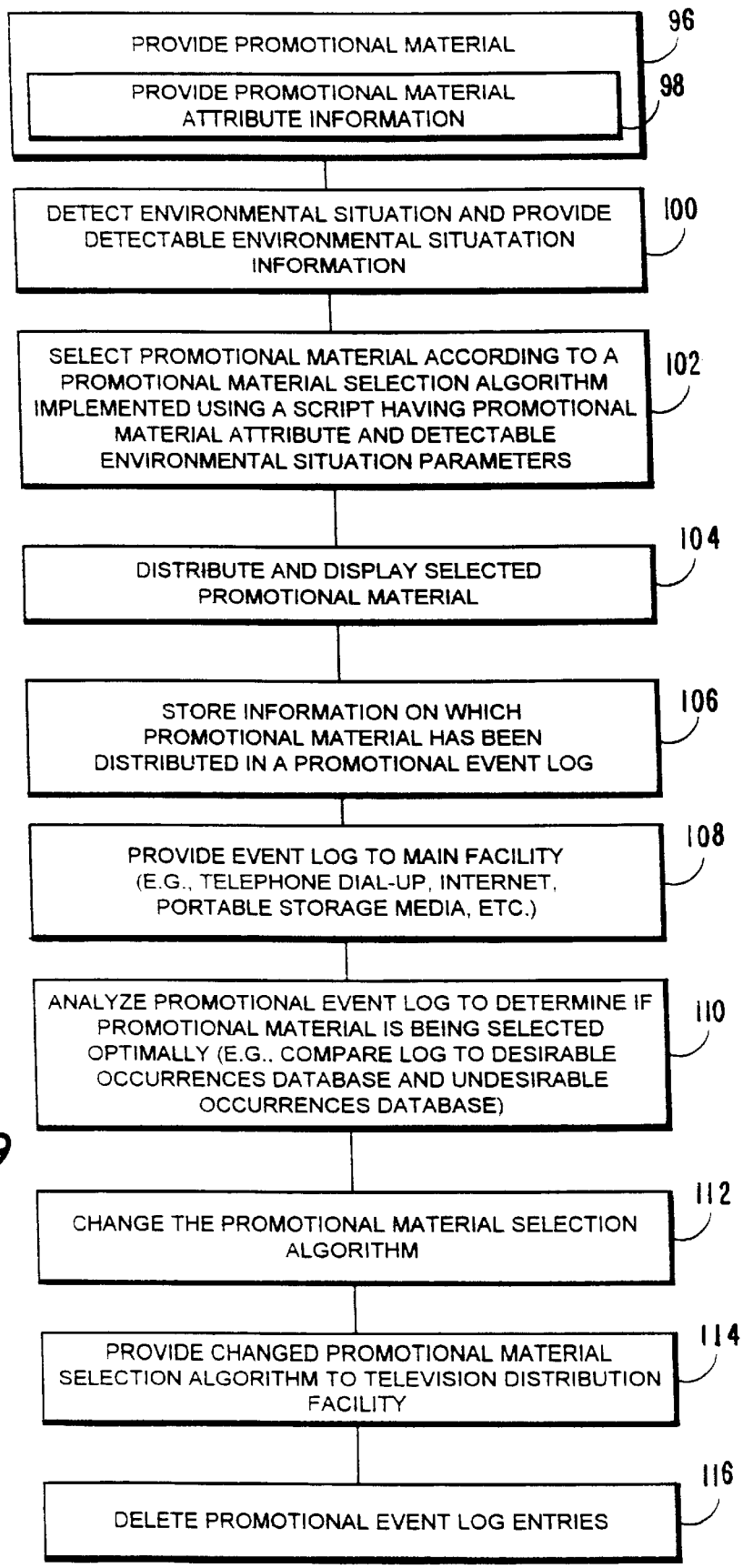
FIGS. 9–11 are illustrative flow charts of steps involved in the operation of embodiments of the present invention.
Figure 10:
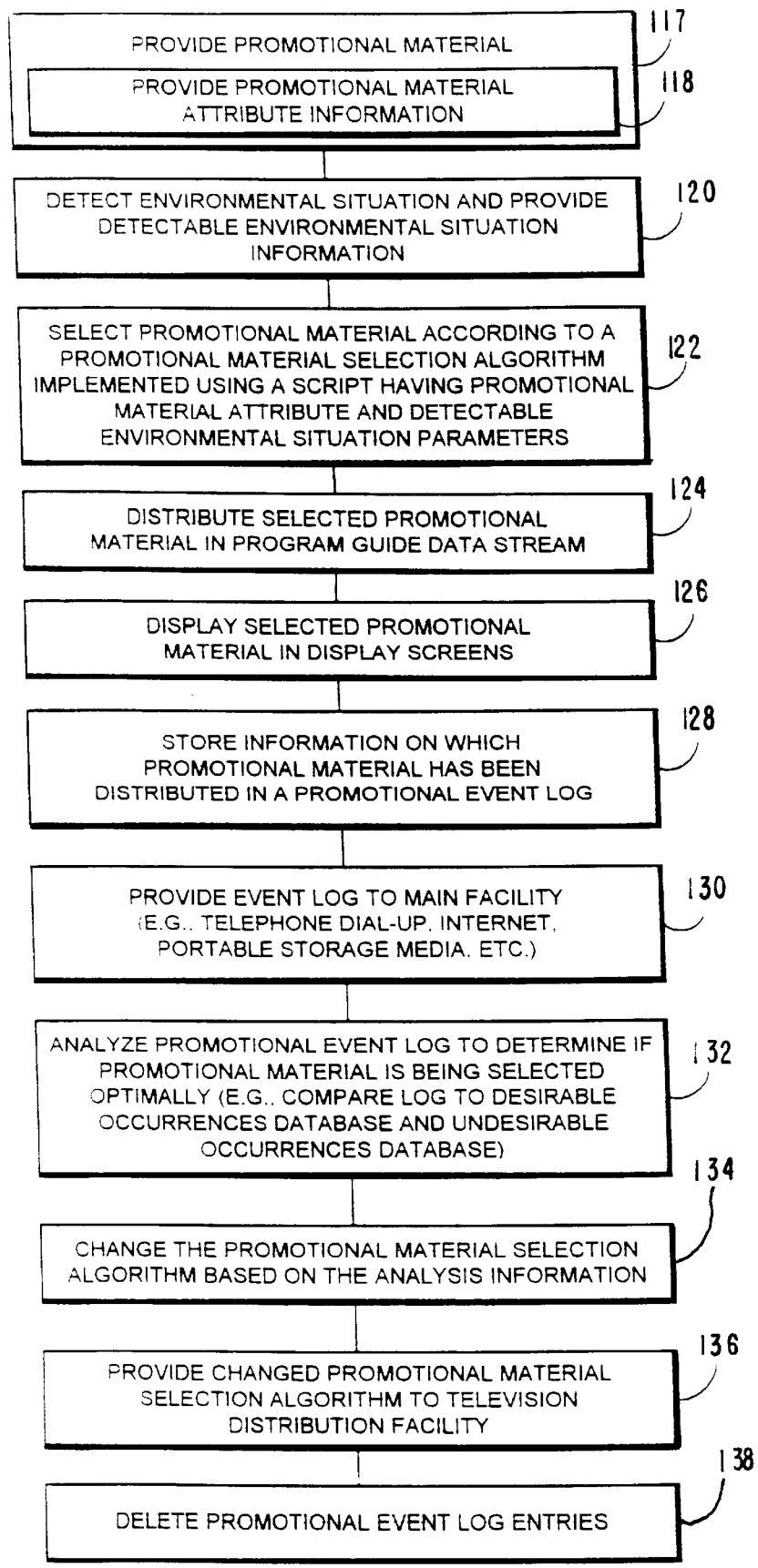
Figure 11:
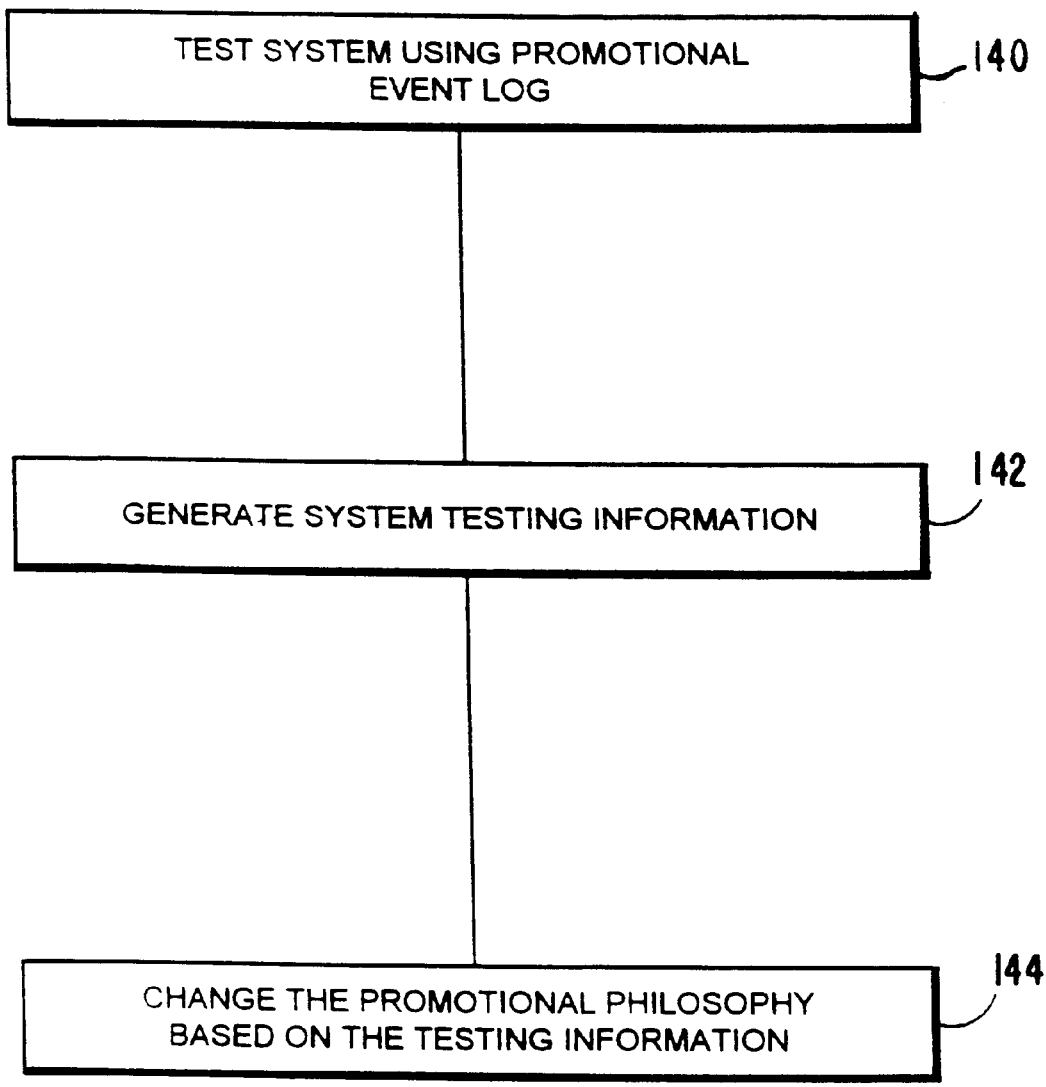

Steps involved in operating the systems of FIGS. 1 and 5 are shown in FIGS. 9–11. The steps illustrated by FIGS. 9–11 are illustrative and may generally be performed in any suitable order.

FIG. 9 is a flowchart of illustrative steps involved in operating the system of FIG. 1. Main facility 12 provides promotional material and program data to television distribution facility 16 at step 96. Promotional material may also be supplied locally at television distribution facility 16. Promotional material attribute information may be supplied by main facility 12 at substep 98. At step 100, environmental situations, e.g., the weather, are detected and detectable environmental situation information is provided to screen generator 42.

At step 102, promotional material is selected for distribution by screen generator 42. The promotional material may be selected for distribution according to a promotional material selection algorithm that may be implemented using a script. The promotional material selection algorithm script may use selection parameters such as promotional material attribute and detectable environmental situation parameters. The selected promotional material is placed on a dedicated television channel on communication paths 20 in screens generated by screen generator 42 and displayed on user television equipment 22 at step 104.

Information on which promotional material has been distributed is stored by promotional event recorder 44 in a promotional event log at step 106. At step 108, the promotional event log may be provided to main facility 12 for analysis over communication path 15. The promotional event log may be provided to main facility 12 using any suitable transmission method (e.g., telephone dial-up). The promotional event log may be analyzed by promotional event log analyzer 30 to determine if the promotional material is being optimally selected. For example, the promotional event log may be compared with a desirable occurrences and an undesirable occurrences database. If desired, the promotional material selection algorithm can be changed to increase the likelihood of desirable occurrences and to decrease the likelihood of undesirable occurrences (step 112). At step 114, the changed promotional material selection algorithm may be provided to television distribution facility 16. Promotional event log entries are deleted by promotional event recorder 44 at step 116.

FIG. 10 is a flowchart of illustrative steps involved in operating the system of FIG. 5. Main facility 52 provides program guide data and promotional material to television distribution facility 56 at step 117. Promotional material attribute information may be supplied by main facility 52 at substep 118. At step 120, environmental situations, e.g., the weather, are detected and detectable environmental situation information is provided to promotional material selection unit 53. Promotional material selection unit 53 may select promotional material for distribution according to a promotional material selection algorithm that may be defined using a script (step 122). The promotional material selection algorithm script may use selection parameters such as promotional material attribute and detectable environmental situation parameters.

At step 124, television distribution equipment 65 distributes the selected promotional material and program guide data as part of, for example, a program guide data stream. At step 126, the interactive program guide may generate display screens that contain the promotional material for display on user television equipment 57. At step 128, information on which promotional material has been distributed is stored in a promotional event log by promotional event recorder 61.

At step 130, television distribution facility 56 may provide the promotional event log to main facility 52 for analysis. The promotional event log may be provided to main facility 52 using any suitable transmission method (e.g., telephone dial-up, Internet link, sending portable storage media by mail carrier, etc.). At step 132, the promotional event log is analyzed to determine if promotional material is being selected optimally. If desired, the promotional material selection algorithm can be changed (e.g., by changing the parameters used by the promotional material selection algorithm script) to increase the likelihood of desirable occurrences and to decrease the likelihood of undesirable occurrences (step 134). At step 136 the changed promotional material selection algorithm is provided to television distribution facility 56. At step 138 promotional entry log entries are deleted by promotional event recorder 61.

FIG. 11 is a flowchart of illustrative steps involved in testing a promotional material selection algorithm used in the systems of FIGS. 1 and 5. Testing of a promotional material selection algorithm may be desirable when changes to the promotional material selection algorithm are proposed and it is desirable to see how the new promotional material selection algorithm will work in, for example, systems 10 and 11 of FIGS. 1 and 5. At step 140, a promotional material selection algorithm is tested using the promotional event log to determine if the system will select promotional material optimally. This may be accomplished, for example, by comparing the promotional event log with a desirable occurrence database and an undesirable occurrences database. The testing may be performed at the main facility or other interested testing facility, or by monitoring a separate process running at a television distribution facility. System testing information (e.g., the types or number of desirable and undesirable occurrences that occur) may be generated at step 142. If the promotional material selection algorithm as tested is desirable, changes to the existing promotional material selection algorithm are made accordingly at step 144. The existing promotional material selection algorithm may be replaced by the test promotional material selection algorithm.

The foregoing is merely illustrative of the principles of this invention and various modifications can be made by those skilled in the art without departing from the scope and spirit of the invention.

What is claimed is:

1. A system in which promotional material is provided by a main facility to at least one television distribution facility for distribution to the user television equipment of a plurality of users, the system comprising:

means at the television distribution facility for selecting at least some of the promotional material for distribution to the user television equipment of the plurality of users according to a promotional material selection algorithm;

means for distributing the selected promotional material to the user television equipment of the plurality of users;

means for logging in a promotional event log which of the promotional material was distributed by the means for distributing the promotional material;

means for providing the promotional event log to the main facility;

means at the main facility for automatically analyzing the promotional event log to determine whether the selected promotional material was optimally selected by the means for selecting;

means at the main facility for changing the promotional material selection algorithm when the means for analyzing determines that the selected promotional material was not optimally selected; and means for providing the changed promotional material selection algorithm to the television distribution facility for use by the means for selecting.

2. The system defined in claim 1 wherein the means for analyzing the promotional event log to determine whether promotional material was optimally selected by the means for selecting further comprises means for comparing the promotional event log to one or more desirable occurrences and for comparing the promotional event log to one or more undesirable occurrences to determine if the selection of promotional material by the means for selecting was optimal.

3. The system defined in claim 2 wherein the means at the main facility for changing the promotional material selection algorithm comprises means for changing the promotional material selection algorithm to increase the likelihood of desirable occurrences.

4. The system defined in claim 2 wherein the means at the main facility for changing the promotional material selection algorithm comprises means for changing the promotional material selection algorithm to decrease the likelihood of undesirable occurrences.

5. The system defined in claim 1 wherein the promotional material selection algorithm is implemented having promotional material selection parameters used by the means for selecting.

6. The system defined in claim 5 wherein the promotional material selection parameters comprise promotional material attribute parameters and the system further comprises means for providing promotional material attribute information which is used by the means for selecting to determine if the promotional material attribute parameters have been met.

7. The system defined in claim 5 wherein the promotional material selection parameters comprise detectable environmental situation parameters and the system further comprises means for providing detectable environmental situation information which is used by the means for selecting to determine if the detectable environmental situation parameters have been met.

8. The system defined in claim 1 further comprising means for generating one or more promotional material display screens that contain the promotional material selected by the means for selecting.

9. The system defined in claim 1 further comprising means for generating one or more program guide display screens that contain the promotional material selected by the means for selecting using an interactive television program guide.

10. The system defined in claim 1 wherein the means for providing the promotional event log to the main facility comprises a dial-up connection.

11. The system defined in claim 1 wherein the means for providing the promotional event log to the main facility comprises an Internet connection.

12. The system defined in claim 1 wherein the means for providing the promotional event log to the main facility comprises a satellite link.

13. The system defined in claim 1 wherein the means for providing the promotional event log to the main facility comprises portable storage media.

14. The system defined in claim 1 wherein the promotional event log contains entries of information relating to each provided promotional material, the system further comprising means for deleting the entries.

15. A method in which promotional material is provided by a main facility to at least one television distribution facility for distribution to the user television equipment of a plurality of users, the method comprising:

selecting at least some of the promotional material for distribution to the user television equipment of the plurality of users according to a promotional material selection algorithm;

distributing the selected promotional material to the user television equipment of the plurality of users;

logging in a promotional event log which of the promotional material was distributed to the user television equipment;

providing the promotional event log from the television distribution facility to the main facility;

automatically analyzing the promotional event log to determine whether the promotional material was optimally selected;

changing the promotional material selection algorithm when promotional material was not optimally selected; and providing the changed promotional material selection algorithm from the main facility to the television distribution facility.

16. The method defined in claim 15 wherein analyzing the promotional event log and determining if the promotional material was optimally selected further comprises comparing the promotional event log to one or more desirable occurrences and for comparing the promotional event log to one or more undesirable occurrences to determine if the selection of promotional material was optimal.

17. The method defined in claim 16 wherein changing the promotional material selection algorithm comprises changing the promotional material selection algorithm to increase the likelihood of desirable occurrences.

18. The method defined in claim 16 wherein changing the promotional material selection algorithm comprises changing the promotional material selection algorithm to decrease the likelihood of undesirable occurrences.

19. The method defined in claim 15 further comprising selecting at least some of the promotional material using a promotional material selection algorithm that is implemented having promotional material selection parameters.

20. The method defined in claim 19 wherein the promotional material selection parameters comprise promotional material attribute parameters, and the method further comprises:

providing promotional material attribute information; and selecting at least some of the promotional material using the promotional material attribute information to determine if the promotional material attribute parameters have been met.

21. The method defined in claim 19 wherein the promotional material selection parameters comprise detectable environmental situation parameters and the method further comprises:

providing detectable environmental situation information; and selecting at least some of the promotional material to determine if the detectable environmental situation parameters have been met.

22. The method defined in claim 15 further comprising generating one or more promotional material display screens that contain the selected promotional material.

23. The method defined in claim 22 further comprising generating one or more program guide display screens that contain the selected promotional material using an interactive television program guide.

24. The method defined in claim 15 wherein providing the promotional event log to the main facility comprises providing the promotional event log to the main facility using a dial-up connection.

25. The method defined in claim 15 wherein providing the promotional event log to the main facility comprises providing the promotional event log to the main facility using an Internet connection.

26. The method defined in claim 15 wherein providing the promotional event log to the main facility comprises providing the promotional event log to the main facility using a satellite link.

27. The method defined in claim 15 wherein providing the promotional event log to the main facility comprises providing the promotional event log to the main facility using portable storage media.

28. The method defined in claim 15 wherein the promotional event log contains entries of information relating to each provided promotional material, the method further comprising deleting the entries.

29. A system in which promotional material is provided by a main facility to at least one television distribution facility for distribution to the user television equipment of a plurality of users, the system comprising:

a television distribution facility comprising:

a screen generator configured to select at least some of the promotional material for distribution to the user television equipment of the plurality of users according to a promotional material selection algorithm and which is configured to generate one or more promotional material display screens that contain the selected promotional material;

television distribution equipment that distributes the promotional material display screens to the user television equipment of the plurality of users;

a promotional event recorder configured to log in a promotional event log which of the promotional material was distributed by the means for distributing the promotional material; and a communications device that provides the promotional event log to the main facility; and a main facility comprising:

a promotional material data source that provides the promotional material and the promotional material selection algorithm to the television distribution facility;

a communications device that receives the promotional event log from the television distribution facility; and a promotional event log analyzer configured to analyze the promotional event log and determine whether the promotional material was optimally selected by the screen generator and configured to change the promotional material selection algorithm when the selected promotional material was not optimally selected by the screen generator, wherein:

the promotional material data source also provides the changed promotional material selection algorithm to the television distribution facility.

30. The system defined in claim 29 wherein the promotional event log analyzer is further configured to compare the promotional event log to one or more desirable occurrences and to compare the promotional event log to one or more undesirable occurrences to determine if the selection of promotional material by the screen generator was optimal.

31. The system defined in claim 30 wherein the promotional event log analyzer is further configured to change the promotional material selection algorithm to increase the likelihood of desirable occurrences.

32. The system defined in claim 30 wherein the promotional event log analyzer is further configured to change the promotional material selection algorithm to decrease the likelihood of undesirable occurrences.

33. The system defined in claim 29 wherein the promotional material selection algorithm is implemented having promotional material selection parameters that are used by the screen generator to select at least some of the promotional material.

34. The system defined in claim 33 wherein the promotional material selection parameters comprise promotional material attribute parameters and the main facility is further configured to provide promotional material attribute information which is used by the screen generator to select at least some of the promotional material to determine if the promotional material attribute parameters have been met.

35. The system defined in claim 33 wherein the promotional material selection parameters comprise detectable environmental situation parameters and the system further comprises an environmental detector that is configured to detect environmental situations and to provide detectable environmental situation information which is used by the screen generator to select at least some of the promotional material to determine if the detectable environmental situation parameters have been met.

36. The system defined in claim 29 wherein the communications device of the television distribution facility provides the promotional event log to the main facility using a dial-up connection.

37. The system defined in claim 29 wherein the communications device of the television distribution facility provides the promotional event log to the main facility using an Internet connection.

38. The system defined in claim 29 wherein the communications device of the television distribution facility provides the promotional event log to the main facility using a satellite link.

39. The system defined in claim 29 wherein the television distribution facility is configured to provide the promotional event log to the main facility using portable storage media.

40. The system defined in claim 29 wherein the promotional event log contains entries of information relating to each provided promotional material, and wherein the promotional event recorder is further configured to delete the entries.

41. A system in which promotional material is provided by a main facility to at least one television distribution facility for distribution to the user television equipment of a plurality of users, the system comprising:

a television distribution facility comprising:
- a promotional material selection unit configured to select at least some of the promotional material for distribution to the user television equipment of the plurality of users according to a promotional material selection algorithm;
- television distribution equipment that distributes the promotional material to the user television equipment of the plurality of users;
- a promotional event recorder configured to log in a promotional event log which of the promotional material was distributed by the means at the television distribution facility for distributing the promotional material; and
- a communications device that provides the promotional event log to the main facility;

a main facility comprising:
- a program guide data source that provides the promotional material and the promotional material selection algorithm to the television distribution facility;
- a communications device for receiving the promotional event log from the television distribution facility; and
- a promotional event log analyzer configured to analyze the promotional event log and determine whether the promotional material was optimally selected by the promotional material selection unit and configured to change the promotional material selection algorithm when promotional material was not optimally selected, and wherein the program guide data source provides the changed promotional material selection algorithm to the television distribution facility; and
- means for generating one or more program guide display screens containing the promotional material that is distributed to the user television equipment using an interactive television program guide.

42. The system defined in claim 41 wherein the promotional event log analyzer is further configured to compare the promotional event log to one or more desirable occurrences and to compare the promotional event log to one or more undesirable occurrences to determine if the selection of promotional material by the promotional material selection unit was optimal.

43. The system defined in claim 42 wherein the promotional event log analyzer is further configured to change the promotional material selection algorithm to increase the likelihood of desirable occurrences.

44. The system defined in claim 42 wherein the promotional event log analyzer is further configured to change the promotional material selection algorithm to decrease the likelihood of undesirable occurrences.

45. The system defined in claim 41 wherein the promotional material selection algorithm is implemented having promotional material selection parameters used by the promotional material selection unit.

46. The system defined in claim 45 wherein the promotional material selection parameters comprise promotional material attribute parameters and the main facility is further configured to provide promotional material attribute information which is used by the promotional material selection unit to determine if the promotional material attribute parameters have been met.

47. The system defined in claim 45 wherein promotional material selection parameters comprise detectable environmental situation parameters and the television distribution facility further comprises an environmental detector that is configured to detect environmental situations and to provide detectable environmental situation information which is used by the promotional material selection unit to determine if the detectable environmental situation parameters have been met.

48. The system defined in claim 41 wherein the communications device of the television distribution facility provides the promotional event log to the main facility using a dial-up connection.

49. The system defined in claim 41 wherein the communications device of the television distribution facility provides the promotional event log to the main facility using an Internet connection.

50. The system defined in claim 41 wherein the communications device of the television distribution facility provides promotional event log to the main facility using a satellite link.

51. The system defined in claim 41 wherein the television distribution facility is configured to provide the promotional event log to the main facility using portable storage media.

52. The system defined in claim 41 wherein the promotional event log contains entries of information relating to each provided promotional material, and wherein the promotional event recorder is further configured to delete the entries.

* * * * *